United States Patent
Voronov et al.

(10) Patent No.: US 6,783,745 B1
(45) Date of Patent: Aug. 31, 2004

(54) FULLENE BASED SINTERED CARBON MATERIALS

(75) Inventors: Oleg A. Voronov, Highland Park, NJ (US); Gary S. Tompa, Belle Mead, NJ (US)

(73) Assignee: Diamond Materials, Inc., Piscataway, NJ (US)

(*) Notice: Subject to any disclaimer, the term of this patent is extended or adjusted under 35 U.S.C. 154(b) by 0 days.

(21) Appl. No.: 09/787,015
(22) PCT Filed: Sep. 13, 1999
(86) PCT No.: PCT/US99/21174
§ 371 (c)(1), (2), (4) Date: Mar. 12, 2001
(87) PCT Pub. No.: WO00/15548
PCT Pub. Date: Mar. 23, 2000

Related U.S. Application Data

(60) Provisional application No. 60/100,078, filed on Sep. 14, 1998.

(51) Int. Cl.[7] ............................ C01B 31/02; C01B 31/06
(52) U.S. Cl. .................... 423/446; 423/445 B; 428/408; 427/249.12
(58) Field of Search .............................. 423/445 B, 446, 423/447.2; 428/408; 427/249.12

(56) References Cited

U.S. PATENT DOCUMENTS 6,245,312 B1 * 6/2001 Blank et al. ............ 423/445 B

OTHER PUBLICATIONS

Blank et al. "Phase transformations in solid C60 at high–pressure–high–temperature treatment and the structure of 3D polymerized fullerites" Sep. 1996, Physics Letters A, vol. 220, pp. 149–157.*

Kozlov et al. "Transformation of C60 fullerenes into a superhard form of carbon at moderate pressure" Mar. 6, 1995, Applied Physics Letters, vol. 66, No. 10, pp. 1199–1201.*

Hirai et al. "Changes in structure and electronic state from C60 fullere to amorphous diamond" Jun. 1, 1995, Physical Review B vol. 51, No. 21, pp. 15555–15558.*

* cited by examiner

Primary Examiner—Stuart L. Hendrickson
Assistant Examiner—Peter J Lish
(74) Attorney, Agent, or Firm—William L. Botjer

(57) ABSTRACT

A new class of carbon materials and their synthesis. The new carbon materials are formed by high pressure and high temperature processing of fullerene based carbon powder. The new carbon materials are harder than graphite and can be harder than steel (what the starting fullerenes are single wall nanotubes) or almost as hard as diamond (when the starting fullerened arm $C_{60}$ buckyballs). The physical attributes of the materials can also be controlled by the pressing and heating parameters. These new carbon materials are conductive like graphite and unlike diamond which is an insulator. The materials can be formed by powder metallurgy techniques into any shape (cylinders, balls, tubes, rods, cones, foils, fibers or others). The new materials can also be readily doped, converted to diamond, formed within a porous composite or converted to diamond within the porous composite.

15 Claims, No Drawings

FULLENE BASED SINTERED CARBON MATERIALS

CROSS REFERENCE TO RELATED APPLICATIONS

This application claims priority of U.S. provisional application Ser. No. 60/100,078 filed Sep. 14, 1998.

STATEMENT OF GOVERNMENT SUPPORT OF THE INVENTION

The work resulting in this invention was supported by the Defense Advanced Projects Agency (DARPA). Defense Small Business Innovation Research Program ARPA order No. D611, Amdt 27 issued by U.S. Army Aviation and Missile Commander under Contract DAAH01-98CR008.

BACKGROUND AND SUMMARY OF THE INVENTION

The present application is directed to a new class of carbon materials and their synthesis.

The conventional carbon materials are graphite, graphitelike ceramics or diamond and diamond-like ceramics. These materials are produced from carbon-containing compounds; oil, gases, coal, wood, coke, soot, graphite powder, diamond powder, hydrocarbons, polymers or mined as natural minerals. The lattice of graphite consist of planar layers of hexagons, where the carbon atoms have $sp^2$-hybridization of the electron shells. The lattice of diamond consists of tetragons, where the carbon atoms have $sp^3$-hybridization of the electron shells. Graphite is a very soft and weak material, with a hardness of 1 on the Mohs scale (1–2 for some graphite-like ceramics), it is conductive, sometimes referred to as a semimetal. Diamond is an extremely hard and tough material with a Mohs hardness of 10, it is non-conductive, but may be made semiconductive with doping.

Recently, much study has been made of ordered carbon molecules having distinct geometries, such as spheres (known as "buckyballs") and tubular shapes ("nanotubes"), these geometric shapes are generally comprised of relatively large numbers of carbon atoms such as $C_{60}$, $C_{70}$, $C_{80}$ etc. These ordered carbon molecules are often referred to as "Fullerenes" after the architect Buckminster Fuller, whose geometric designs the molecules resemble. The new carbon materials are synthesized (sintered) using powder metallurgy and/or ceramic pressing techniques from relatively pure amounts of ordered carbon nanoparticles such as $C_{60}$ buckyballs (which have a spherical icosahedral symmetry) and nanotubes (which can be thought of as a tubular microcrystal of graphite or a much elongated buckyball with open or closed ends) at high pressures and high temperatures (HPHT).

The new carbon materials are formed by pressing and heating of powder in the form of specially prepared fullerenes. These carbon materials are much harder than graphite and graphite like ceramics and are almost as hard as diamond, depending on the starting fullerenes, the pressing and heating parameters. These new carbon materials are conductive like graphite. The material can be formed by powder metallurgy techniques into any shape (cylinders, balls, tubes, rods, cones, foils, fibers or others). The pressure of compacting is from 1.0–10.0 GPa, the temperature is 300–1000° C. and the period of time is from 1–10000 second. The special carbon soots are: (a) nanotube like, (b) buckyball like, or (C) mixtures of the same with similar diameters (one dimension size) of particles of 0.7–7.0 nm.

The particles are pure carbon of 99% or more preferably 99.9+ % (or specially doped by other elements), separated by a narrow range of diameters, for example 0.7–1.0 nm;

The physical properties of the new carbon materials that are produced depend on the type and purity of the starting fullerenes. A strong carbon conductive material is formed by HPHT processing when the starting fullerenes comprise purified single wall nanotubes (or a mixture of single walled nanotubes and buckyballs) which has a hardness (7–9½ on the Mohs Scale) greater than that of steel but less than that of silicon carbide (SiC). When the starting fullerenes comprise purified $C_{60}$ buckyballs of uniform size an extremely hard (9½–10 on the Mohs Scale) conductive amorphous carbon material is formed under HPHT processing which has a hardness greater than that of silicon carbide and which is only slightly less hard than non-conductive diamond or cubic boron nitride. The new carbon materials may be formed within porous ceramic composite "sponges" to form other useful engineering materials by first impregnating the porous ceramic with the appropriate carbon compound and then converting them directly into the new carbon materials.

In particular, the two new carbon materials; 1) nanotube based sintered carbon material and 2) buckyball based sintered carbon material, exhibit hardnesses better than stainless steel (for nanotube based sintered carbon material) and near that of diamond (for buckyball based sintered carbon material). These materials are near isotropic "polymeric" materials, not poly or single crystalline materials. The polymeric isotropicity is what sets these materials apart—they are extremely tough, greatly resisting fracturing in comparison to c-BN or diamond or other crystals.

Synthesis of the new carbon materials has been demonstrated for millimeter sized pellets, which allow characterization of mechanical, electrical and other properties that are pertinent to military, industrial and scientific applications. The new carbon materials, with their high strength and toughness, may well fulfill the need for lightweight engineering materials for military, aerospace, automotive, and other industries. Since the materials are conductive, they may also be superconductive or be made semiconductive, in either case especially with proper dopants. It is theorized that the new carbon material is a semimetal and that the new carbon material based ceramics may have the metallic and semiconductive type of conductivity depending on dopants and parameters of synthesis.

Traditional graphite may be transformed into diamond at pressure of 15 GPa and temperature of 4000° C. Graphite mixed with metals Ni, Fe, Co or alloys or hydrocarbons may be transformed into diamond in the P,T-region of the thermodynamical stability of diamond, for example at pressure of 5.5 GPa and temperature of 1500° C. Graphite may be transformed into diamond in presence of atomic hydrogen and a diamond substrate in the P,T region of the thermodynamical stability of graphite, for example at low pressure of 0.104 Mpa and a graphite substrate temperature of 2000° C. (if the temperature of the diamond substrate is 600–1000° C). Conversely, diamond may be transformed into graphite at pressure of 0.1 Mpa and temperature of 2000° C. Diamond mixed with metals Ni, Fe, Co or alloys may be transformed into graphite in P,T-region of the thermodynamical stability of graphite, for example at pressure of 0.1 Mpa and temperature of 1000° C. in inert gas.

It has also been found that the buckyball based sintered carbon material can be transformed into polycrystalline or monocrystalline diamond at temperatures and pressures less that than needed for graphite. Furthermore, the buckyball based sintered carbon material may be transformed into monocrystalline diamond in the presence of alloys that do not catalyze the transformation of graphite into diamond.

The new buckyball based sintered carbon material can be used to provide ceramic composite materials. It was found that the smallest particles of carbon soot (buckyball $C_{60}$) have the property of superplasticity in the temperature range of 200–400° C. at pressures of 0.01 to at least 1.0 GPa. Graphite, diamond, $B_4C$, WC/Co, Cu, Ti, TiC, SiC, Be, W, B, Fe and other porous sponges were prepared by various standard methods and impregnated with carbon soot at a pressure of 1.0 GPa and a temperature of 300° C. The sample then was cooled, the pressure was thereafter increased to 2.5 GPa and the temperature increased to 400° C. and held for 1000 sec. The particles of soot were sintered together inside the pores by HPHT treatment to produce composites with a new carbon material matrix which was found to be harder than silicon carbide (30 Gpa).

DESCRIPTION OF THE PREFERRED EMBODIMENTS

For optimum consolidation of the new fullerene based sintered carbon materials it has been important to utilize high purity levels in the starting buckyball and nanotube powders. Generation of fullerenes by the conventional graphite electric arc method yields $C_{60}$, a number of higher fullerenes, and other carbonaceous materials such as nanotubes, nanoparticles and insoluble residue (as a whole, known as soot or carbon black).

Production of fullerene based sintered carbon material generally requires: 1) purification of the starting material into at least 99%, and preferably >99.9%, pure carbon material of either buckyball $C_{60}$ or single walled nanotubes 2) agglomeration (compaction) of the purified fullerene powder into a relatively dense material and 3) HPHT processing (sintering) of the purified, compacted fullerenes to produce the fullerene based sintered carbon materials.

Purification of nanotubes from nanotube/nanoparticle mixtures has been tried with standard techniques such as filtration, chromatography, centrifugation of sonicated solution of raw material. Recently the oxidation of nanoparticles at higher temperatures has proved to yield high purity nanotubes. It has been reported that carbon nanotubes are more resistant to oxidation in air than other fullerene derivatives, for example nanotubes oxidize completely at ~800° C., whereas buckyballs require ~515° C. for complete oxidation. Alternatively, an iterative process of sublimation and solvent rinses has been used to purify buckyballs and nanotubes.

Previous experience in synthesis of microscopic quantities of buckyball based sintered carbon material from $C_{60}$ buckyballs has demonstrated the typical need for long-term treatment of the buckyball powder samples at 160° C.–400° C. to remove absorbed gases and contaminants of organic compounds. It has been found that sublimed and recondensed agglomerates make the best compaction material because they overcome discrete particle adsorbate contamination and static charging. Of course, if a supplier can achieve sufficient levels of purity and agglomeration, the need to perform these steps is minimized.

Sample Preparation and Compaction Procedures

The following procedures for sample preparation and compaction were used: The samples were placed in graphite heating elements. As produced $C_{60}$ buckyball powder contains a lot of admixtures of organic compounds. To purify the raw $C_{60}$, —the material was sublimated in a gradient quartz tube inserted into the furnace with one cold end. The tube was connected to a vacuum pump and a helium cylinder. $C_{60}$ was evaporated at the hot zone of the tube and deposited at the cold end. Organic compounds were mostly removed into the vacuum system in gaseous form. The growth of fullerene grains was observed through the quartz glass. When the size of the crystals was large enough, the cooled part of the tube was disconnected and the grains were poured into a crucible. The grains were then separated by size, (for example 60/40 microns) using sieves and a shaking device, coarse grains up to 1000/800 microns were also used. Such pure fullerene $C_{60}$ buckyball powder is easily agglomerated by cold pressing in a die at a pressure of 0.05–0.50 Gpa. An agglomerated material with density of $\rho=1.6$ g/cm$^3$, was achieved, which is greater than the density of some types of graphite ceramics ($\rho=1.5$ g/cm$^3$). Utilizing precleaned buckyball and nanotube high purity agglomerates, powders were cold pressed into discs at pressures of 0.05 to 0.5 GPa The same procedure was tried with multi-wall nano-tubes, however they could not be agglomerated by cold pressing. It is impossible to cold compact this type of carbon black in the examined pressure range, as is also the case for acethylene soot or any other tube or soot, where the particles are not separated properly. The poured density of soot is about 0.1 g/cm$^3$, which is only 2.5% of that of solid carbon. The density of agglomerated soot is 0.30–0.35 g/cm$^3$. Agglomeration of multi-wall nanotubes also gives a density of 0.35–0.40 g/cm$^3$. It is possible to achieve such density by agglomerating nanograin diamond-like explosive soot. However, in the phase space examined, such density is not high enough for further sintering under high pressure, and HPHT treatment is not effective. It appears that density of the sintered bulk material depends on the density of the "green body". Thus, the initial powder density is a critical parameter. However, single-wall nano-tubes are easily agglomerated by the same method as buckyballs. Cold pressing inside the die at a pressure of 0.05 to 0.5 GPa gives pellets with $\rho=1.4–1.5$ g/cm$^3$.

HPHT Consolidation of the Agglomerated Fullerene Powders

The synthesis of man made diamonds has taken place for many years, this synthesis uses high pressure and temperature processing of carbon materials, usually in the presence of metal alloys which act as catalysts. Thus machinery capable of such HPHT processing has also been known for some time, as the temperatures and pressures required for carrying out the steps to produce the fullerene based sintered carbon materials of the present invention are either similar to, or less than, those for man made diamond production, the equipment used in those processes may be used herein. A suitable HPHT apparatus is shown in U.S. Pat. No. 3,746,484 to Vereshagin et al entitled "Apparatus for Developing High Pressure and High Temperature" which issued on Jul. 17, 1973; the disclosure of which is hereby incorporated by reference as if fully set forth herein. Other suitable apparatus is shown in U.S. Pat. No. 2,941,242 to Hall which issued in June 1960. It should be noted for processes requiring pressures of less than 5.0 Gpa simpler apparatus can be effectively used.

The HPHT equipment of the above noted Vereshagin et al patent includes a graphite crucible for holding the powders to be processed. An electric current is passed through the crucible which provides the necessary heating. The crucible is-held between contoured anvils which are acted upon by a hydraulic press to provide the necessary pressure. In the case at hand the buckyball material was purified and then agglomerated to preferably form 50–100 micron grain size powder, although larger or smaller sizes are also useable. The powder was further agglomerated into pellets by cold pressing. The samples were put into the graphite crucible, which also serves as the heater, and placed in the HPHT apparatus.

A number of samples were prepared from buckyball carbon soot processed as described above, and thereafter subjected to HPHT sintering. In table 1 to follow the sample number is shown in column 1, the pressure used in the HPHT processing is shown in the first column, the pressure is shown in the second column, the temperature is shown in the third column, the time to which the sample is subjected to the temperature and pressure is shown in the fourth column, the hardness of the processed sample is shown in the fifth column and the resistivity of the sample is shown in the sixth column:

TABLE 1

| No | P, Gpa | T, °C. | t, sec. | H, Gpa | R ohms*cm |
|----|--------|--------|---------|--------|-----------|
| 1  | 9.0    | 400    | 1000    | 45     | 0.006     |
| 2  | 8.0    | 400    | 1000    | 40     | 0.008     |
| 3  | 7.0    | 400    | 1000    | 38     | 0.009     |
| 4  | 5.5    | 400    | 1000    | 35     | 0.0085    |
| 5  | 2.5    | 400    | 1000    | 31     | 0.04      |
| 6  | 1.0    | 400    | 1000    | 1      | 10        |
| 7  | 8.0    | 300    | 1000    | 0.1    | >$10^{10}$ |
| 8  | 8.0    | 500    | 1000    | 41     | 0.0075    |
| 9  | 8.0    | 600    | 1000    | 42     | 0.007     |
| 10 | 8.0    | 700    | 1000    | 43     | 0.0065    |
| 11 | 8.0    | 800    | 1000    | 43     | 0.006     |
| 12 | 8.0    | 900    | 1000    | 20     | 0.005     |
| 13 | 8.0    | 1000   | 1000    | 10     | 0.003     |
| 14 | 8.0    | 400    | 1       | 1      | 10        |
| 15 | 8.0    | 400    | 10      | 10     | 1.0       |
| 16 | 8.0    | 400    | 100     | 25     | 0.1       |
| 17 | 8.0    | 400    | 10000   | 43     | 0.007     |
| 18 | 9.0    | 350    | 10000   | 50     | 0.005     |

It is also seen that the hardness of the buckyball based sintered carbon material can be controlled by the selection of pressure, temperature and processing time. In summary, the results are: sample hardness grows with pressure, temperature and holding time up to the temperature 800° C., then the hardness decreases. The samples sintered at 200–350° C. are usually still soft; samples sintered at 400–800° C. are usually hard. The pressure of 2.5 GPa, temperature of 500° C., holding of 1000 sec. are high enough parameters to obtain the samples that scratch monocrystalline SiC, as well as all other materials, excluding cubic boron nitride (c-BN) and diamond. It was found that the conductivity of the samples increases as the hardness increases, the soft samples were good insulators with the hardest samples having a resistivity of approximately 10-2 ohms/cm at ambient temperature and pressure. For single wall nanotube based sintered carbon material the process parameters set forth in Table 1 will produce material of similar properties but with somewhat less hardness, see Table 2 to follow. It may also be possible to utilize pressures less than 1.0 Gpa or greater than 10 Gpa if the other parameters are adjusted to compensate therefore.

Table 2 below compares certain physical properties of the fullerene based sintered carbon materials synthesized herein with other carbon based materials: graphite, diamond and ceramics based thereon. It is seen that the nanotube based sintered carbon material is harder, denser and stronger than graphite and graphite based ceramics while still being conductive. It is seen that the buckyball based sintered carbon material has hardness, density and strength properties which closely approach that of diamond, yet the material is very conductive while diamond is an insulator.

TABLE 2

| Material Properties | G | G-Based Ceramics | D | D-Based Ceramics | Bu* | Nt |
|---|---|---|---|---|---|---|
| Density p, gm/cm³ | 2.2 | 1.5–2.1 | 3.5 | 3.0–3.4 | 2.3–3.0 | 2.3–2.8 |
| Hardness H, Gpa Mohs | 0.1 ½–1 | 0.1–1.0 ½–6 | 60–100 10 | 60–75 10 | 1.0–60 6–10 | 1.0–30 6–9 ½ |
| Resistivity ξ, Ω cm | $10^{-5}$–$10^{-2}$ | $10^{-2}$–$10^{-3}$ | $10^{24}$ | $10^{6}$–$10^{12}$ | 0.01–10 | 0.01–10 |

G-graphite, D-diamond,
Bu-buckyball based sintered carbon material (as sintered at P = 1.0–10.0 GPa)
Nt-nanotube based sintered carbon material (as sintered at P = 1.0–10.0 GPa)
*typical properties as shown by sample 5.

Theoretical evaluation shows that the compressive strength and density of the buckyball based sintered carbon materials should approach that of diamond which has unsurpassed compressive strength and compressive strength to density ratio.

Diamond Creation

Buckyball based sintered carbon material may be transformed into polycrystalline diamond more readily than graphite ceramics at pressures of 7.0–9.0 Gpa. Generally, buckyball based sintered carbon material transforms into polycrystalline diamond at lower temperature and for a shorter time in the presence of Ni—Mn and Ni—Cr alloys than graphite. The temperature of transformation into diamond was 800–1300° C. with a holding time of 0.1–100 sec. Transformation usually occurs in 3–4 seconds, some samples were obtained in 1 second, perhaps less. In addition to Ni based alloys, other suitable alloys for creation of polycrystalline diamond are Fe and Co based alloys (Ni—Fe—Co, Ni—Cr, Ni—Fe—Co—Cr and the like). A mixture with pure Ni transforms with a detonative reaction, so the speed of transformation is higher than the speed of sound in the solid state.

A surprising result is that buckyball based sintered carbon material may be transformed into monocrystalline diamond in the presence of Al—Mg—Ca alloys and other alloys that do not catalyze the transformation of graphite into diamond. Transformation at P=2.5–9.0 Gpa, T=400–1300° C. and t=10–1000 seconds was studied. The samples were white or white-grey, or black-grey nanograined powders or an amorphous material. White transparent unshaped or cubically shaped with mirror facets, white with black inclusions or black monocrystals of diamond may be easily removed from this powder by tweezers. The size of crystals is 0.1–1 mm at a holding time of 100 seconds, electron beam diffraction analysis of these samples, demonstrates that they are single crystals of diamond. X-ray analysis of these samples demonstrates that they are pure carbon. They have a hardness of 10 on Mohs scale.

Composite Material

The new buckyball based sintered carbon material can be used to provide ceramic composite materials. It was found that the smallest fullerene particles of carbon soot (buckyball $C_{60}$) have the property of superplasticity in the temperature range of 200–400° C. at pressures of 0.01–1.0 GPa. Graphite, diamond, B, C, $B_4C$, SiC, TiC, WC/Co, Cu, Ti, Fe, Be, W and other ceramic and/or metal porous composite "sponges" were prepared by various standard methods and impregnated with buckyball based carbon soot at a pressure of 1.0 GPa and a temperature of 300° C. The sample then was cooled, the pressure was thereafter increased to 2.5 GPa and the temperature increased to 400° C. and held for 1000 sec. The buckyball particles were sintered together inside the pores after the HPHT treatment to produce composites with a new carbon material matrix which was found to be harder than silicon carbide (30 Gpa). When processed into prototype cutting/drilling tool bits, these composites have shown cutting rates comparable to or exceeding those measured for commercially available polycrystalline diamond composites. Further HPHT processing at the parameters and alloys described above for diamond creation can convert the buckyball based sintered carbon material into diamond within the porous matrix.

Doped Fullerene Based Sintered Carbon Material

The electronic properties of the fullerene based sintered carbon materials can be altered by doping with hydrogen, boron, nitrogen, oxygen, sulphur, fluorine, chlorine, and other elements. Such doping can result in tough new polymers and—new organic compounds as well as providing semiconductivity or superconductivity to the fullerene based sintered carbon materials. As the amount of dopant required is typically 0.0001 to 1.0% by weight. The doping can be achieved by mixing the >99% fullerene powder(either buckyballs or nanotubes) with powders containing a predetermined quantity of the dopants, such as hydrocarbons (for example naphthalene) or carboranes (for example o-carborane). The fullerene carbon powder and the dopant containing powder are then sintered together.

In summary, a new class of carbon materials is formed by the methodology of the present application. The new carbon materials are formed by high pressure and high temperature processing of fullerene based carbon powder. The new carbon materials are harder than graphite and either almost as hard as diamond or harder than steel, depending on the starting fullerenes ($C_{60}$ buckyballs or single wall nanotubes, respectively) as well as the pressing and heating parameters. The new carbon materials are either completely amorphous and isotropic (when formed from buckyballs) or almost completely amorphous and isotropic (when formed from single wall nanotubes). These new carbon materials are conductive like graphite and unlike diamond which is an insulator. The materials can be shaped by powder metallurgy techniques into any configuration. The new materials can also be readily converted to diamond or formed within a porous composite.

The invention has been described with respect to preferred embodiments.

However, as those skilled in the art will recognize, modifications and variations in the specific details which have been described and illustrated may be resorted to without departing from the spirit and scope of the invention as defined in the appended claims.

What is claimed is:

1. A hard carbon material having a density greater than 2.3 g/cm³ and a hardness from 1.0 Gpa to 50 Gpa formed by the process of:
   a) providing a fullerene based carbon powder comprising at least 99% single walled nanotubes,
   b) agglomerating said fullerene based carbon powder to a density above 1.4 g/cm³;
   c) subjecting said fullerene based carbon powder to a pressure of 1.0 to 10.0 Gpa, a temperature of from 300–1000° C. for a period of time from 1 to 10000 seconds.

2. The carbon material as claimed in claim 1, wherein the fullerene based powder comprises at least 99.9% single walled nanotubes.

3. The carbon material as claimed in claim 1, wherein the pressure is at least 2.5 GPa, the temperature is at least 500° C., and the period of time is at least 1000 seconds.

4. The carbon material as claimed in claim 1, wherein the fullerene based powder comprises 0.0001 to 1.0% of a dopant to effect the electrical properties of the material.

5. The carbon material as claimed in claim 4, wherein the dopant is selected from the group consisting of hydrogen, boron, nitrogen, oxygen, sulphur, fluorine, and chlorine.

6. A process for forming a high density sintered conductive carbon material, having a hardness from 1.0 Gpa to 50 Gpa, comprising the steps of:
   a) providing an fullerene based carbon powder having at least 99.9% by weight of single walled nanotubes,
   b) agglomerating said fullerene based carbon powder to a density above 1.4 g/cm³;
   c) subjecting said fullerene based carbon powder to pressure of 1.0 to 10.0 Gpa, a temperature of from 300–1000° C. for a period of time of from 1 to 10000 seconds.

7. The process as claimed in claim 6, further including the steps of infiltrating said fullerenes by superplastic flow under temperature and pressure into a porous composite material and said subjecting step takes place after said fullerene based carbon powder has been infiltrated into the porous material.

8. The process as claimed in claim 7, wherein the superplastic flow takes place at temperatures of 200–400° C. at pressures of 0.1–1.0 Gpa.

9. The process as claimed in claim 6, wherein the fullerene based carbon powder comprises 0.0001 to 1.0% of a dopant to effect the electrical properties of the material.

10. A conductive hard, high density carbon material comprising at least 99.9% by weight of single walled nanotubes subjected to heat, temperature and pressure sufficient to provide a hardness to the material of at least 1.0 Gpa and less than 50 Gpa with a resistivity of less than 10 ohms-cm and a density above 2.3 g/cm³.

11. The material as claimed in claim 10, further including 0.0001 to 1.0% of a dopant to effect the electrical properties of the material.

12. A process for forming a high density sintered conductive carbon material, having a hardness from 1.0 Gpa to 50 Gpa, comprising the steps of:
   a) providing an fullerene based carbon powder having at least 99.9% buckyballs
   b) agglomerating said fullerene based carbon powder to a density above 1.4 g/cm³;
   c) subjecting said fullerene based carbon powder to pressure of 1.0 to 10.0 Gpa, a temperature of from 300–1000° C. for a period of time of from 1 to 10000 seconds;
   d) providing an alloy used to convert carbon materials to diamond, and
   e) subjecting said carbon material to a pressure of 7.0 to 9.0 Gpa, a temperature of from 800–1300° C. for a period of time from 0.1 to 100 seconds to convert the carbon material to polycrystalline diamond.

13. The process as claimed in claim 12, wherein the alloys are based on at least one of Ni, Fe and Co.

14. A process for forming a high density sintered conductive carbon material, having a hardness from 1.0 Gpa to 50 Gpa, comprising the steps of:

a) providing an fullerene based carbon powder having at least 99.9% buckyballs b) agglomerating said fullerene based carbon powder to a density above 1.4 g/cm³;

c) subjecting said fullerene based carbon powder to pressure of 1.0 to 10.0 Gpa, a temperature of from 300–1000° C. for a period of time of from 1 to 10000 seconds;

d) providing a metal alloy selected form the group comprising aluminum, magnesium and calcium alloys; and e) subjecting said carbon material to a pressure of 2.5 to 9.0 Gpa, a temperature of from 400–1300° C. for a period of time from 10 to 1000 seconds to convert the carbon material to monocrystalline diamond.

15. A process for forming a high density sintered conductive carbon material, having a hardness from 1.0 Gpa to 50 Gpa, comprising the steps of:

a) providing an fullerene based carbon powder having at least 99% fullerenes, b) agglomerating said fullerene based carbon powder to a density above 1.4 g/cm³;

c) infiltrating said fullerenes by superplastic flow under temperature and pressure into a porous composite material; and c) subjecting said infiltrated composite material to pressure of 1.0 to 10.0 Gpa, a temperature of from 300–1000° C. for a period of time of from 1 to 10000 seconds.

* * * * *